United States Patent [19]

Ujiie et al.

[11] Patent Number: 5,480,736

[45] Date of Patent: Jan. 2, 1996

[54] FUEL CELL GENERATION APPARATUS AND A METHOD FOR STARTING THE SAME

[75] Inventors: Takashi Ujiie; Makoto Ito, both of Kawasaki, Japan

[73] Assignee: Fuji Electric Co., Ltd., Kawasaki, Japan

[21] Appl. No.: 371,553

[22] Filed: Jan. 11, 1995

[30] Foreign Application Priority Data

Jan. 20, 1994 [JP] Japan .................................. 6-004301

[51] Int. Cl.⁶ .................................................. H01M 8/04
[52] U.S. Cl. .................................................. 429/13; 429/23
[58] Field of Search ................................. 429/12, 13, 22, 429/23; 323/271, 270, 272

[56] References Cited

U.S. PATENT DOCUMENTS 5,141,824  8/1992  Hirota ........................................ 429/23
5,156,928  10/1992  Takabayashi ............................. 429/23

Primary Examiner—Anthony Skapars
Attorney, Agent, or Firm—Spencer, Frank & Schneider

[57] ABSTRACT

A fuel cell generation apparatus including a plurality of fuel cells to be connected in parallel. Each of the fuel cells is connected in parallel with a serial circuit of a starting load and a switch. Each of the parallel circuit thus formed is connected in series with one of second switches, and the serial circuits thus formed are parallelly connected to form the fuel cell generation apparatus which is connected to a load. The starting loads are closed at the start of the operation of the fuel cell generation apparatus to drop the output voltages of the fuel cells to a voltage lower than a minimum voltage in no-load open-circuit voltages of the fuel cells. The fuel cell generation apparatus is started by closing the first switches, and then closing the second switches, and finally opening the first switches. This facilitates implementing a large capacity fuel cell generation apparatus whose efficiency is improved by eliminating diodes for preventing reverse currents from flowing.

4 Claims, 3 Drawing Sheets

FUEL CELL GENERATION APPARATUS AND A METHOD FOR STARTING THE SAME

BACKGROUND OF THE INVENTION

1. Field of the Invention

The present invention relates to a fuel cell generation apparatus and a method for starting the same, the fuel cell generation apparatus being composed of a plurality of parallelly connected fuel cells and used as a large capacity generation facility.

2. Description of Related Art

A large capacity fuel cell generation apparatus is often composed of a plurality of fuel cells connected in parallel. Since each fuel cell has different properties, a reverse current will occur owing to property differences if fuel cells are simply connected in parallel.

FIG. 1 shows an example, in which two fuel cells 1A and 1B are connected in parallel to form a fuel cell generation apparatus which supplies power to a load 2.

FIG. 2 shows voltage-current characteristics of the fuel cells 1A and 1B. They exhibit proper drooping characteristics A and B, and have proper no-load open-circuit voltages $E_{OA}$ and $E_{OB}$ when the current is zero. In FIG. 2, the no-load open-circuit voltage $E_{OB}$ of the fuel cell 1B is lower than the no-load open-circuit voltage $E_{OA}$ of the fuel cell 1A. The voltage-current characteristic of the fuel cell generation apparatus consisting of the two fuel cells 1A and 1B is represented by a line S which is obtained by combining the current values of the two fuel cells at identical voltages. For example, when the output voltage of the fuel cell generation apparatus is $e_s$, the output current $i_s$ of the fuel cell generation apparatus is the sum of a current $i_A$ due to the fuel cell 1A and a current $i_B$ due to the fuel cell 1B. In FIG. 2, $i_2$ designates the output current of the fuel cell 1A when the output voltage of the fuel cell generation apparatus is $E_{OB}$. When the load current $i_s$ is lower than the current $i_2$, the current of the fuel cell $i_B$ becomes negative, which means that a reverse current will flow into the fuel cell 1B. In other words, if the two fuel cells 1A and 1B have different no-load open-circuit voltages $E_{OA}$ and $E_{OB}$, and $E_{OA} > E_{OB}$, a reverse current will flow into the fuel cell 1B having a lower no-load open-circuit voltage, when the output voltage of the fuel cell generation apparatus $e_s$ is in a range of $E_{OB} < e_s < E_{OA}$. Since the steady state operation of the fuel cell generation apparatus is performed at the output current $i_s$ which is much greater than $i_2$, the reverse current does not occur. However, since the output current $i_s$ increases from zero at the start of the operation, the reverse current flows until the output current $i_s$ reaches the current $i_2$.

Although the foregoing description handles the most simple case where two fuel cells are connected in parallel, a common fuel cell generation apparatus includes n (n is an integer greater than two) fuel cells connected in parallel. Assuming that no-load open-circuit voltages of the n fuel cells are $E_{O1}, E_{O2}, E_{O3}, \ldots, E_{Oi}, \ldots, E_{On}$, and that $E_{O1} > E_{O2} > E_{O3} > \ldots E_{Oi} > \ldots > E_{On}$, forward currents will flow through all the n fuel cells when the output voltage $e_s$ is lower than any no-load open-circuit voltage $E_{Oi}$, and hence, no reverse current will occur. However, when the output voltage $e_s$ is $E_{Oi-1} > e_s > E_{Oi}$, although forward currents will flow through the fuel cells whose no-load open-circuit voltages are $E_{O1}, E_{O2}, \ldots E_{Oi-1}$, reverse currents will flow through the fuel cells whose no-load open-circuit voltages are $E_{Oi}, E_{Oi+1}, \ldots, E_{On}$.

Such reverse currents will not only increase power loss, but also degrade the characteristics of the fuel cells. Accordingly, it is essential for a fuel cell generation apparatus including fuel cells connected in parallel to prevent a reverse current from flowing.

FIG. 3 shows a conventional fuel cell generation apparatus, in which two fuel cells are connected in parallel and a reverse current is prevented. The fuel cells 1A and 1B are connected in series with diodes 3A and 3B, respectively, and the serial circuits of the fuel cell and the diode are connected in parallel to form a fuel cell generation apparatus. The diodes 3A and 3B prevent the reverse current from flowing even when the output voltage is higher than the minimum no-load open-circuit voltage.

In this arrangement, however, since the output currents of individual fuel cells flow through the diodes, the diodes must have current capacity corresponding to a maximum load current. Thus, when large capacity fuel cells are connected in parallel through the large capacity diodes corresponding to the capacity of the fuel cells, there arises a problem in that the fuel cell generation apparatus becomes expensive, or technically difficult to be implemented depending on capacity. In addition, with the arrangement of FIG. 3, another problem arises in that the efficiency of the fuel cell generation apparatus reduces owing to the loss of the diodes because the output current flows through the diodes without fail.

SUMMARY OF THE INVENTION

It is therefore an object of the present invention to eliminate the above-mentioned problems, and to provide a fuel cell generation apparatus and a method for starting the same, which can prevent reverse currents and efficiency drop with a simple arrangement, even if a plurality of large capacity fuel cells are connected in parallel.

In a first aspect of the present invention, there is provided a fuel cell generation apparatus including N (N is an integer equal to or greater than two) fuel cells to be connected in parallel, the fuel cell generation apparatus comprising:

N first switches;

N starting loads, each of which is connected in series with one of the first switches to form N first serial circuits, each of the N first serial circuits being connected in parallel with one of the N fuel cells to form N first parallel circuits, each of the starting loads setting an output voltage of the fuel cell connected thereto via the first switch at a voltage lower than a minimum voltage in no-load open-circuit voltages of the fuel cells; and N second switches, each of which is serially connected to one of the first parallel circuits to form N second serial circuits, the second serial circuits being connected in parallel to start an operation of the fuel cell generation apparatus when the second switches are closed, wherein the N second switches can be closed only when the N first switches are closed.

Here, each of the N second switches may be an interlock switch which can be changed from an open state to a closed state only when the output voltage of the fuel cell corresponding to the second switch is lower than the minimum voltage in the no-load open-circuit voltages of the fuel cells.

In a second aspect of the present invention, there is provided a method for starting a fuel cell generation apparatus, the fuel cell generation apparatus including N (N is an integer equal to or greater than two) fuel cells connected in parallel, N first switches, N starting loads, each of which is connected in series with one of the first switches to form N first serial circuits, each of the N first serial circuits being connected in parallel with one of the N fuel cells to form N first parallel circuits, each of the starting loads setting an output voltage of the fuel cell connected thereto via the first switch at a voltage lower than a minimum voltage in no-load open-circuit voltages of the fuel cells, and N second switches, each of which is serially connected to one of the first parallel circuits to form N second serial circuits, the second serial circuits being connected in parallel to start an operation of the fuel cell generation apparatus when the second switches are closed, the method comprising the steps of:

closing the N first switches;

closing the N second switches after the output voltage of each of the fuel cells drops below the minimum voltage; and opening the first switches after closing the second switches.

Here, each of the N second switches may be interlocked so that it can be closed only when the output voltage of the fuel cell corresponding to the second switch becomes lower than the minimum voltage in the no-load open-circuit voltages of the fuel cells.

According to the first aspect of the present invention, the second switches are closed to form a parallel connection of the fuel cells, while the first switches are in the closed state. When the first switches are closed, the output voltages of the respective fuel cells drop below the minimum no-load open-circuit voltage of the fuel cells. As a result, no reverse current flows through the fuel cells even if the fuel cells are connected in parallel. Since it is sufficient to incorporate small starting loads and switches, the arrangement of the fuel cell generation apparatus is simple.

When interlock switches are employed as the second switches, the operation of the switches can be performed without fail. Thus, the reverse current through the fuel cells can be prevented more positively.

According to the second aspect of the present invention, since the starting loads are disconnected from the fuel cells in a short time, the loss due to the starting loads is limited to a small amount at the start of the operation of the fuel cell generation apparatus. This makes it possible to improve the efficiency as compared with the conventional technique which uses diodes.

The above and other objects, effects, features and advantages of the present invention will become more apparent from the following description of the embodiment thereof taken in conjunction with the accompanying drawings.

DETAILED DESCRIPTION OF PREFERRED EMBODIMENT

The invention will now be described with reference to the accompanying drawings.

Figure 4:
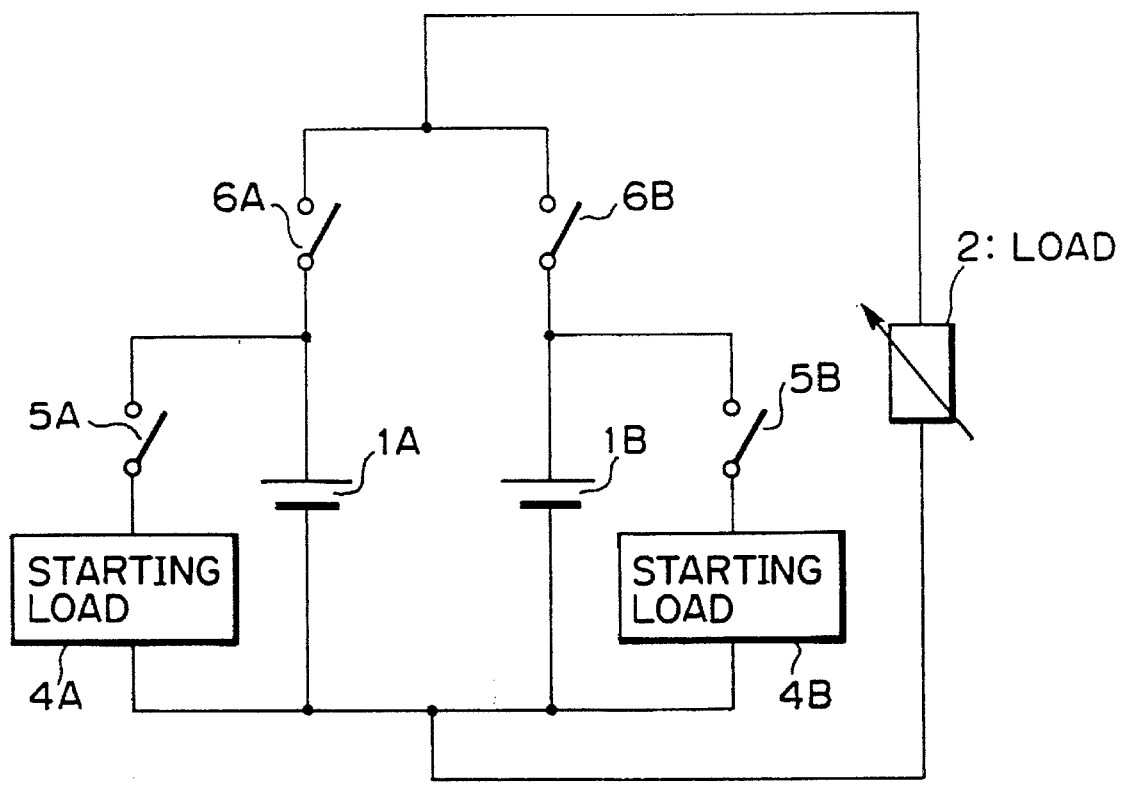
FIG. 4 is a circuit diagram showing an embodiment of a fuel cell generation apparatus in accordance with the present invention.

FIG. 4 shows an embodiment of a fuel cell generation apparatus in accordance with the present invention, which includes a plurality of fuel cells connected in parallel. This figure exemplifies an apparatus including two parallelly connected fuel cells. In this configuration, a fuel cell 1A is connected in parallel with a serial circuit of a starting load 4A and a switch 5A, and the parallel circuit is connected in series with a switch 6A. Likewise, a fuel cell 1B is connected in parallel with a serial circuit of a starting load 4B and a switch 5B, and the parallel circuit is connected in series with a switch 6B. In addition, these two circuits are connected in parallel to form a fuel cell generation apparatus, which is connected to a load 2.

The starting load 4A has such a characteristic that when it is connected to the fuel cell 1A, the output voltage of the fuel cell 1A takes a voltage $e_c$ lower than the minimum no-load open-circuit voltage ($E_{OB}$, in this case) of the fuel cells 1A and 1B. Likewise, the starting load 4B has a characteristic that when it is connected to the fuel cell 1B, the output voltage of the fuel cell 1B takes the voltage $e_c$. The switch 6A is an interlock switch which can change from the open to closed state only when the switch 5A is closed, and the output voltage of the fuel cell 1A is lower than the minimum no-load open-circuit voltage. Similarly, the switch 6B is an interlock switch which can change from the open to closed state only when the switch 5B is closed, and the output voltage of the fuel cell 1B is lower than the minimum no-load open-circuit voltage.

With this arrangement, the starting operation of the fuel cell generation apparatus is performed as follows:

(1) The switches 5A and 5B, and the switches 6A and 6B are held open.

(2) The switches 5A and 5B are closed, and the starting loads 4A and 4B are connected to the fuel cells 1A and 1B, respectively. The output voltages of the fuel cells 1A and 1B drop with the increase in the output currents until they reach the set voltage $e_c$ determined by the starting loads 4A and 4B.

(3) The switches 6A and 6B are closed. In this case, although the fuel cells 1A and 1B are connected in parallel, no reverse current will flow because the output voltages are set at $e_c$ which is lower than the minimum no-load open-circuit voltage.

(4) The switches 5A and 5B are opened, and the output power of the fuel cell generation apparatus is increased to steady state output power.

Figure 1:
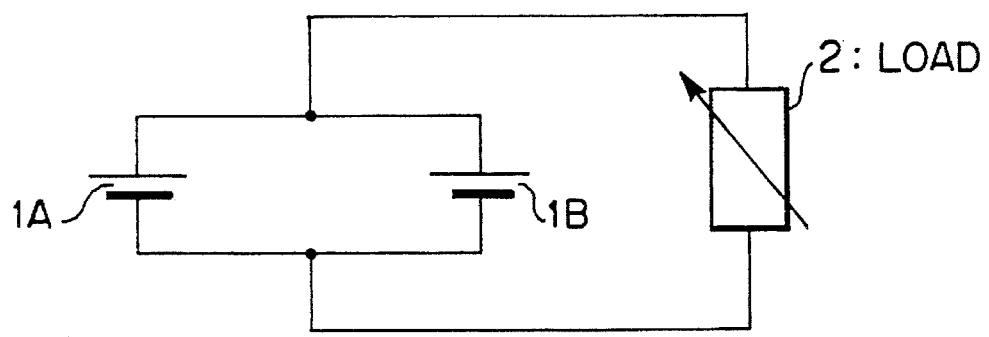
FIG. 1 is a circuit diagram showing a basic parallel connection of fuel cells.
Figure 5:
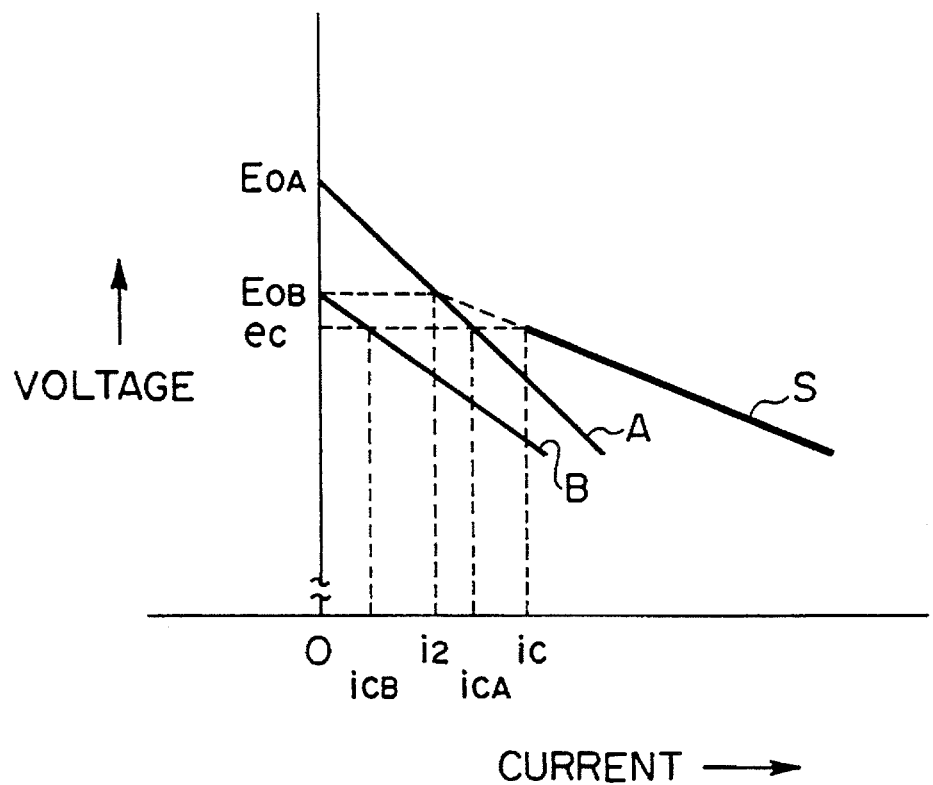
FIG. 5 is a graph showing voltage-current characteristics of the embodiment of the fuel cell generation apparatus of FIG. 4.
Figure 2:
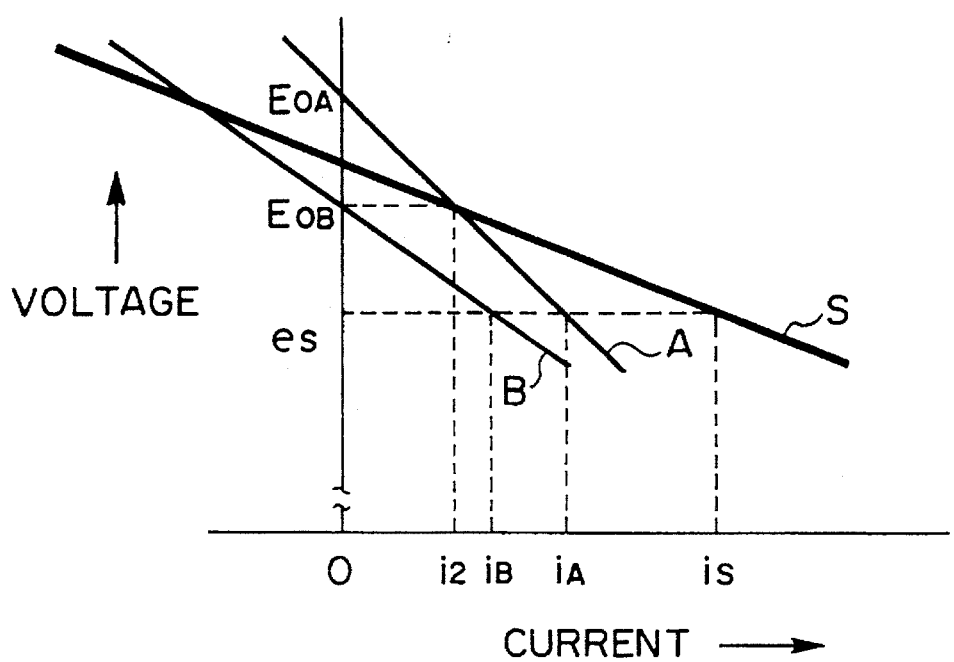
FIG. 2 is a graph showing voltage-current characteristics of the basic parallel connection of fuel cells of FIG. 1.
Figure 3:
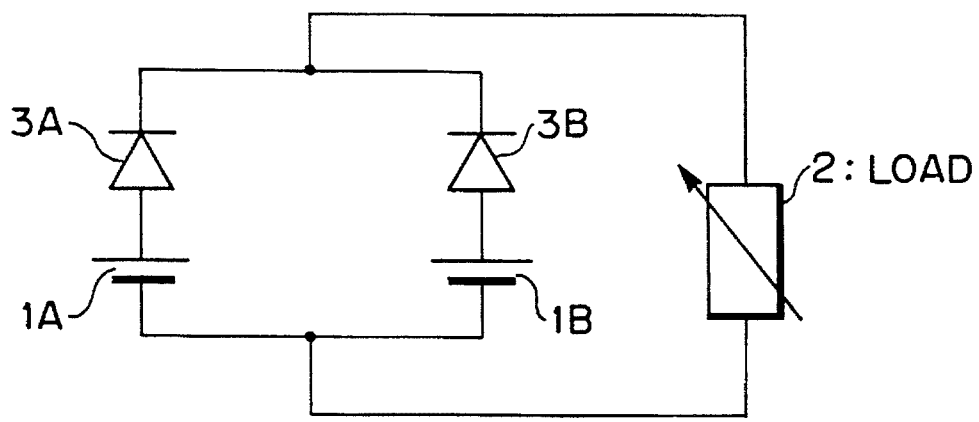
FIG. 3 is a circuit diagram showing a conventional fuel cell generation apparatus.

FIG. 5 illustrates the voltage-current characteristics A and B of the fuel cells 1A and 1B, and the voltage-current characteristic S of the fuel cell generation apparatus, when the no-load open-circuit voltage $E_{OB}$ of the fuel cell 1B is lower than the no-load open-circuit voltage $E_{OA}$ of the fuel cell 1A. The characteristics in the region where the voltage is higher than the set voltage $e_c$ show the characteristics due to the fuel cells 1A and 1B, and the starting loads 4A and 4B. The voltage-current characteristic S of the fuel cell generation apparatus is limited to the area where the voltage is lower than the set voltage $e_c$ and the current is higher than $i_c$ corresponding to the set voltage $e_c$.

According to this embodiment, the fuel cell generation apparatus can be easily formed by incorporating switches and small starting loads. In addition, since the loss is limited to that due to small currents flowing through the starting loads at the start of the operation, there is no steady state loss, and hence, an increase in efficiency can be expected as compared with the conventional apparatus including the diodes connected in series with the fuel cells.

Although an embodiment of the fuel cell generation apparatus is described which includes two fuel cells connected in parallel, a fuel cell generation apparatus including more than two fuel cells connected in parallel can also be arranged. In this case, each fuel cell is connected in parallel with a serial circuit of a starting load and a first switch, and the parallel circuit is connected in series with a second switch. A plurality of these circuits are connected in parallel to form a fuel cell generation apparatus. Each starting load is selected such that the voltage thereacross becomes the set voltage $e_c$ which is lower than the no-load open-circuit voltage of any individual fuel cells. The operation of this fuel cell generation apparatus is carried out as follows: First, the first switches are closed; second, the second switches are closed to connect the fuel cells in parallel after the output voltages of the fuel cells drop below the set voltage $e_c$; and finally, the first switches are opened. The start operation thus performed makes it possible to prevent reverse currents from flowing, and to implement a high efficiency fuel cell generation apparatus.

The present invention has been described in detail with respect to an embodiment, and it will now be apparent from the foregoing to those skilled in the art that changes and modifications may be made without departing from the invention in its broader aspects, and it is the intention, therefore, in the appended claims to cover all such changes and modifications as fall within the true spirit of the invention.

What is claimed is:

1. A fuel cell generation apparatus including N (N is an integer equal to or greater than two) fuel cells to be connected in parallel, said fuel cell generation apparatus comprising:

N first switches;

N starting loads, each of which is connected in series with one of said first switches to form N first serial circuits, each of said N first serial circuits being connected in parallel with one of said N fuel cells to form N first parallel circuits, each of said starting loads setting an output voltage of the fuel cell connected thereto via the first switch at a voltage lower than a minimum voltage in no-load open-circuit voltages of said fuel cells; and N second switches, each of which is serially connected to one of said first parallel circuits to form N second serial circuits, said second serial circuits being connected in parallel to start an operation of said fuel cell generation apparatus when said second switches are closed, wherein said N second switches can be closed only when said N first switches are closed.

2. The fuel cell generation apparatus as claimed in claim 1, wherein each of said N second switches is an interlock switch which can be changed from an open state to a closed state only when the output voltage of said fuel cell corresponding to the second switch is lower than the minimum voltage in the no-load open-circuit voltages of said fuel cells.

3. A method for starting a fuel cell generation apparatus, said fuel cell generation apparatus including N (N is an integer equal to or greater than two) fuel cells connected in parallel, N first switches, N starting loads, each of which is connected in series with one of said first switches to form N first serial circuits, each of said N first serial circuits being connected in parallel with one of said N fuel cells to form N first parallel circuits, each of said starting loads setting an output voltage of the fuel cell connected thereto via the first switch at a voltage lower than a minimum voltage in no-load open-circuit voltages of said fuel cells, and N second switches, each of which is serially connected to one of said first parallel circuits to form N second serial circuits, said second serial circuits being connected in parallel to start an operation of said fuel cell generation apparatus when said second switches are closed, said method comprising the steps of:

closing said N first switches;

closing said N second switches after the output voltage of each of said fuel cells drops below said minimum voltage; and opening said first switches after closing said second switches.

4. The method as claimed in claim 3, wherein each of said N second switches is interlocked so that it can be closed only when the output voltage of said fuel cell corresponding to the second switch becomes lower than the minimum voltage in the no-load open-circuit voltages of said fuel cells.

* * * * *